United States Patent [19]

Novacek

[11] 4,332,336
[45] Jun. 1, 1982

[54] SPREADING APPARATUS FOR MIXED DENSITY MATERIALS

[75] Inventor: Edward P. Novacek, Cedar Rapids, Nebr.

[73] Assignee: International Minerals & Chemical Corp., Terre Haute, Ind.

[21] Appl. No.: 165,915

[22] Filed: Jul. 3, 1980

[51] Int. Cl.³ .............................................. B65D 17/34
[52] U.S. Cl. ..................... 222/269; 222/270; 222/271; 222/609; 222/627; 239/664
[58] Field of Search ............... 222/265, 269, 270, 271, 222/564, 609, 610, 626, 627, 185; 239/664, 650

[56] References Cited

U.S. PATENT DOCUMENTS

| | | | |
|---|---|---|---|
| 1,906,664 | 5/1933 | Thorne | 222/270 X |
| 2,597,326 | 5/1952 | Hoffstetter | 222/270 |
| 2,631,760 | 3/1953 | Hoppes | 222/238 |
| 2,713,442 | 7/1955 | McFarling | 222/270 X |
| 2,760,682 | 8/1956 | Ingram | 222/609 X |
| 2,794,576 | 6/1957 | Reynolds | 222/270 X |
| 2,899,111 | 8/1959 | Christensen | 222/238 |
| 3,356,301 | 12/1967 | Barber et al. | 239/664 |
| 3,425,599 | 2/1969 | Sammarco et al. | 222/177 |
| 3,659,747 | 5/1972 | Telchgraeber | 222/14 |
| 4,234,108 | 11/1980 | Diamond | 222/386 |
| 4,269,330 | 5/1981 | Johnson | 222/386 |

Primary Examiner—Allen N. Knowles
Attorney, Agent, or Firm—H. J. Barnett

[57] ABSTRACT

A spreading apparatus comprising a large hopper disposed above a series of integral mini-hoppers. Each mini-hopper includes positive metering discharge means for uniformly distributing granular materials containing ingredients of mixed densities such as blended fertilizers.

10 Claims, 9 Drawing Figures

SPREADING APPARATUS FOR MIXED DENSITY MATERIALS

BACKGROUND OF THE INVENTION

Most fertilizers comprise a mixture of ingredients which have different specific gravities, and some variation in particle size. Such blended materials are not particularly useful as fertilizers unless each component or ingredient in the blend is uniformly distributed over the area in which the agricultural crop is planted. Lack of one of the fertilizer ingredients in one part of the field, and an excess in another results in spotty yields. Uniform spreading of each fertilizer ingredient over all the crop area insures maximum possible yield from the planted area, as well as most efficient use of the fertilizer per acre planted and fertilized.

There are many and diverse forms of fertilizer spreaders. One of the current commercial models includes a large tractor mounted bulk hopper which moves at a relatively high speed across the area to be fertilized. The granular fertilizer drops down through an orifice at the rear end of the hopper and impacts against a rapidly spinning, horizontally disposed circular plate. The fertilizer is thrown out in a wide, 160° arc behind the spreading vehicle. These units are designed to spread a swath up to about 60 feet wide. When using the above spreader, it is most important that the blended fertilizer comprise particles of substantially identical specific gravity. Otherwise, the heaviest components will be consistently thrown to the outer edge of the swath, and the lighter components will accumulate in a path closer to the spreader.

PRIOR ART

U.S. Pat. No. 2,631,760 describes a fertilizer machine having a pair of augers disposed in the main hopper. However, both of these discharge augers are disposed along a common axis normal to the direction of travel over the field, and they are not disposed in distinct separated portions of the main hopper. The lower discharge compartment of this machine is provided with a single auger which extends transversely through each discharge compartment. The main object of this machine is to separate foreign objects, such stones, sticks, portions of straw and the like prior to the ejection of the fertilizer and grain from the hopper.

Christensen's U.S. Pat. No. 2,899,111 describes a fertilizer spreader having a metered discharge arrangement comprising a plurality of star-shaped wheels, all mounted for rotation on a common shaft transverse to the direction of travel. Each wheel is disposed below a discharge opening from the hopper. The object of the star-shaped wheels is to prevent discharge of fertilizer when the spreader is not in motion. Sammarco et al U.S. Pat. No. 3,425,599 disclose a pair of hoppers mounted on a common carriage. Each hopper has an agitating means, but the agitating means is strictly to encourage gravity flow from the respective hopper. The two hoppers do not interconnect, so they must be loaded separately. The axis of rotation of the agitating means is normal to the direction of travel of the spreader.

Teichgreber's U.S. Pat. No. 3,659,747 shows an automatic feeder having a single large discharge auger with its axis of rotation in the same direction as the direction of travel. Teichgreger's hopper has a plurality of mini-hoppers at the bottom, but the long axis of the main hopper is in the same direction as the single, large discharge auger, and the only discharge opening is at the rear end of the apparatus. The apparatus is not intended for uniform spreading of fertilizer over a wide area. It is intended for semi-automatic dispersal of dry feed to livestock, so the intent is to discharge a large quantity of material into a limited area, such as a feed trough.

BRIEF SUMMARY OF THE INVENTION

The apparatus of the subject invention comprises a large main hopper for receiving a load of granular material which includes a lower portion divided into a plurality of mini-hoppers which taper to individual, uniformly spaced discharge means, each containing a rotatable positive feed means for metering granular material through the respective discharge means at a uniform rate while the spreading apparatus is moved across a field or area on which the granular material is to be spread.

The rotatable positive feed means comprises short augers which rotate about an axis in the same direction as the direction of travel of the apparatus when spreading. The augers are driven at a uniform rate through suitable drive means to insure uniform spreading of the granular material.

Means are provided to pivot the apparatus to decrease its width for travel over public vehicle roadways from one location to another. The apparatus is particularly adapted for uniformly spreading fertilizers which contain a mixture of materials having diverse specific gravities.

DETAILED DESCRIPTION OF THE INVENTION

Figure 1:
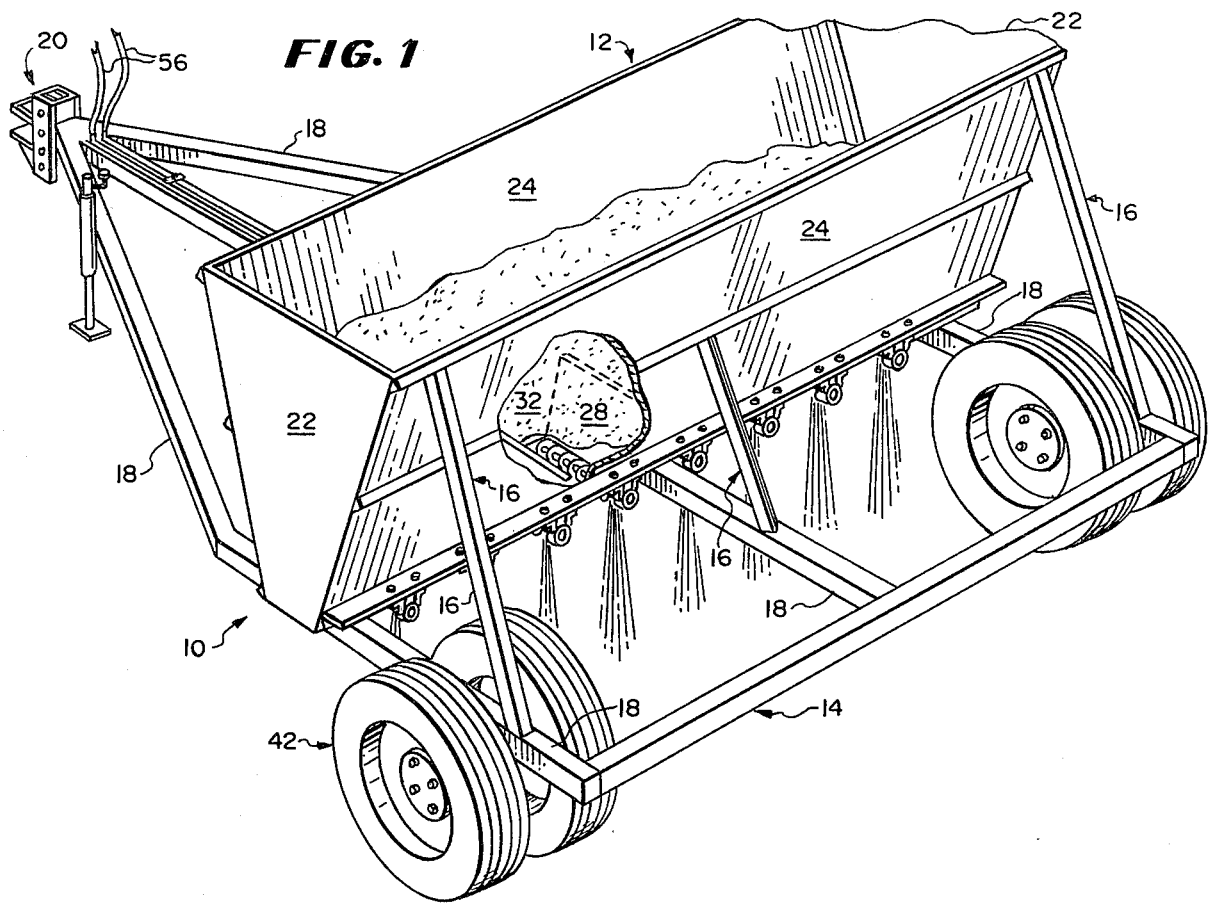
FIG. 1 of the drawings is an overall perspective view with parts broken away of one embodiment of the spreading apparatus of the invention showing dry granular material being discharged.

As shown in the drawings, the gravity or "drop" flow spreader 10 comprises a large, main hopper 12 mounted for support on a frame 14 which includes support struts 16 secured to the hopper 12 at their upper ends and secured to the horizontal beams 18 of the frame 14.

At the leading or front end of the frame 14, the beams 18 converge to define a hitch assembly 20 which is adapted to be hitched to a tractor, or other towing vehicle.

The main hopper 12 includes vertical side walls 22 which are wider at the top, and narrower at the bottom. Diagonally disposed front and rear walls 24 of the hopper 12 converge together towards the bottom of the hopper to ensure uniform flow of fertilizer material 16 to the bottom of the hopper 12.

The bottom of the main hopper 12 is divided into a plurality of integral mini-hoppers 28 which have downwardly converging side walls 30 transverse to the long axis (or width) of the main hopper 12. The bottom portion of the front and rear walls 24 of the main hopper 12 define the integral end walls 32 of each mini-hopper 28.

Disposed at the lower-most portion of each mini-hopper 28 is a fore-and-aft extending, horizontal discharge cylinder 34. Each discharge cylinder 34 houses a mini-auger 36, suitably journaled on bearings at both ends for rotation to drive fertilizer material 26 towards the rear end of the discharge cylinder 34 to be discharged through discharge openings 40 while the spreader 10 is being pulled over a field to be fertilized.

The frame 14 is suspended at the rear end thereof on wheel assemblies 42, and connected by means of the hitch assembly 20 to maintain the discharge openings 40 relatively close to the ground to minimize fertilizer dust and blowing. As can be seen in FIG. 1, the spreader 10 is capable of relatively high rate positive feed discharge of uniformly spaced streams of fertilizer material 26. Since the spreader 10 takes full advantage of gravity flow, and does not include a spinner wheel, the particular ingredients having different densities remain in a uniform mixture and are uniformly distributed on the field as the spreader advances.

Figures 2, 3:
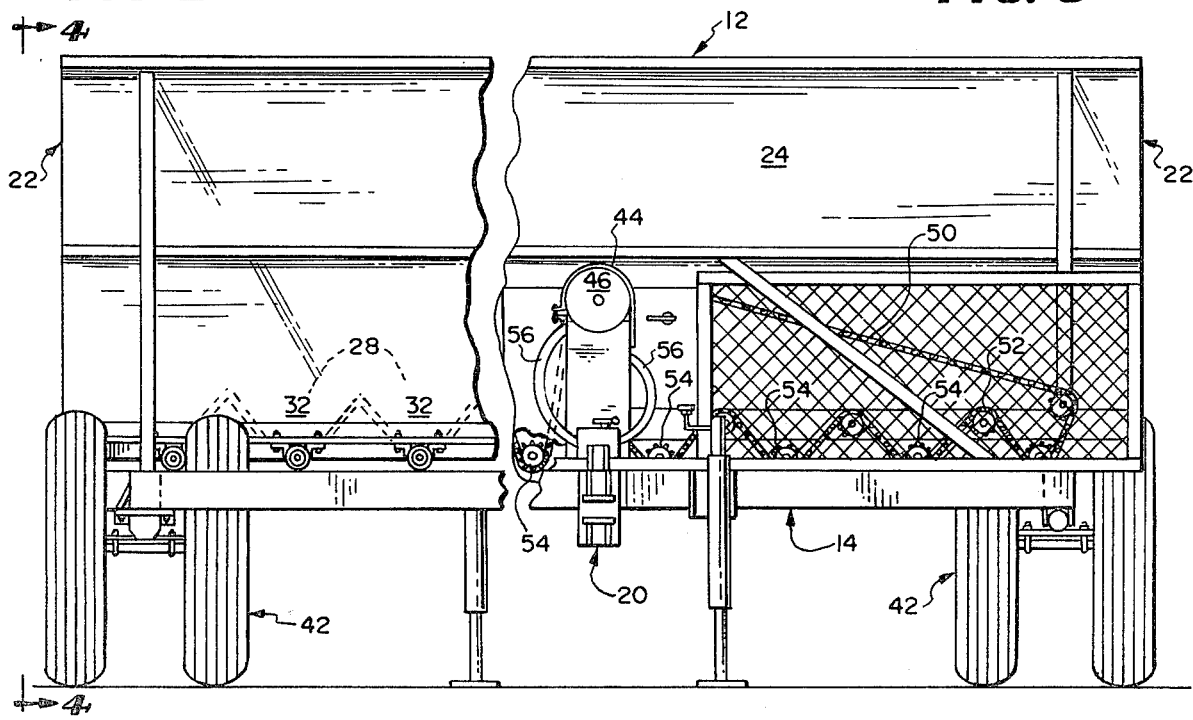
FIG. 2 is an end view of the left rear side of the spreader with parts fragmented and with the mini-hopper contours shown in phantom.
FIG. 3 is an end view of the left front side of the spreader with parts fragmented and showing one embodiment of a positive chain drive system for the mini-augers.
Figure 4:
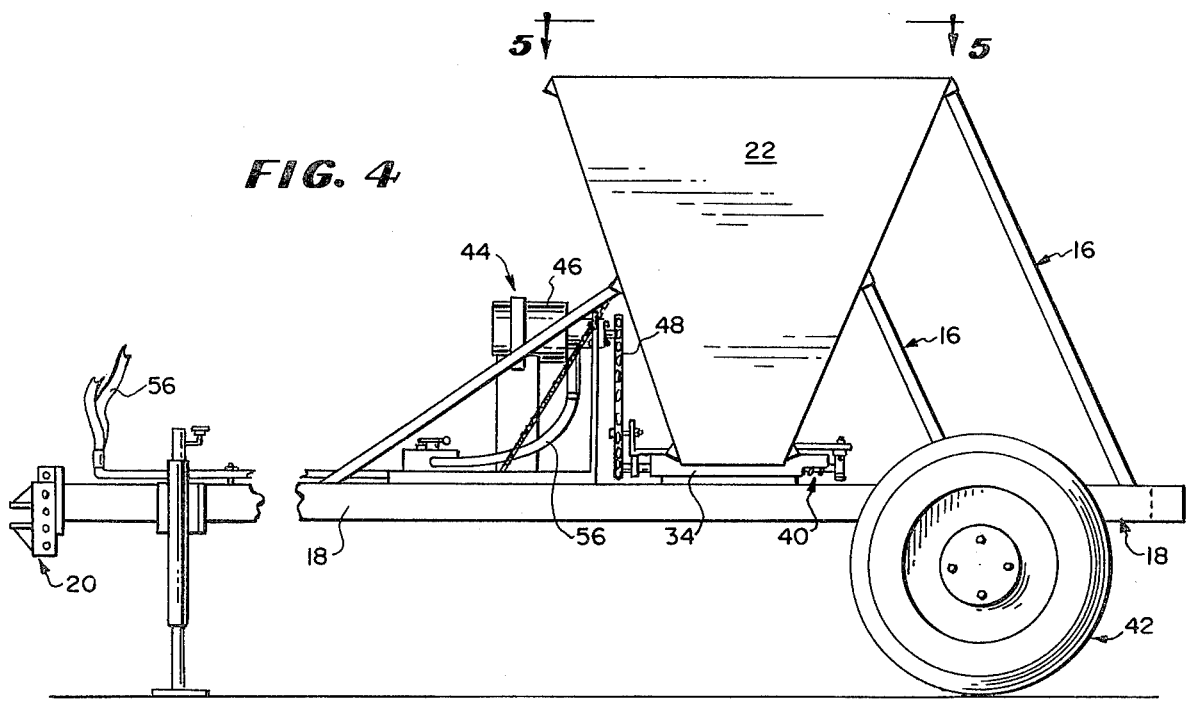
FIG. 4 is a view taken from the left side of the spreading apparatus with parts broken away showing a discharge auger and the discharge opening.
Figure 5:
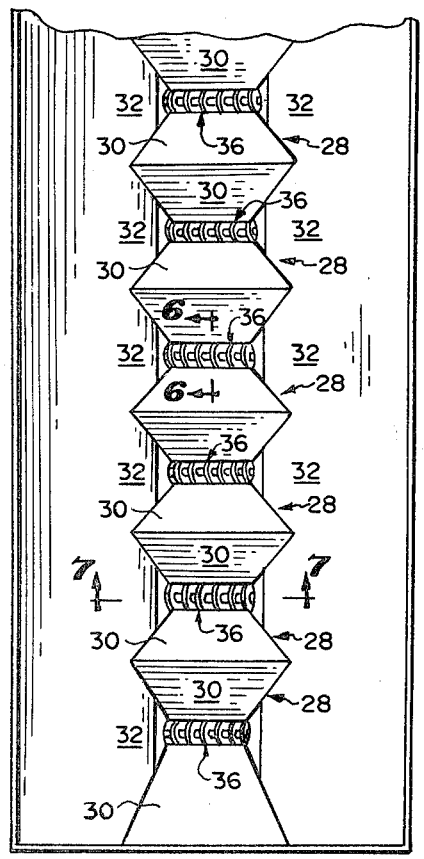
FIG. 5 is a detailed plan view looking down into the top of the main hopper and showing the configuration of the mini-hoppers and mini-augers which are disposed in the bottom portion of the main hopper.
Figure 6:
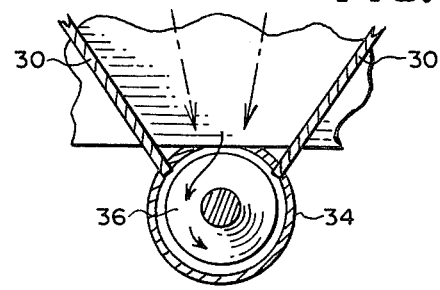
FIG. 6 is a detailed sectional view taken on line 6—6 of FIG. 5 showing a portion of a mini-hopper and its associated mini-auger with arrows showing the path of flow of fertilizer.
Figure 7:
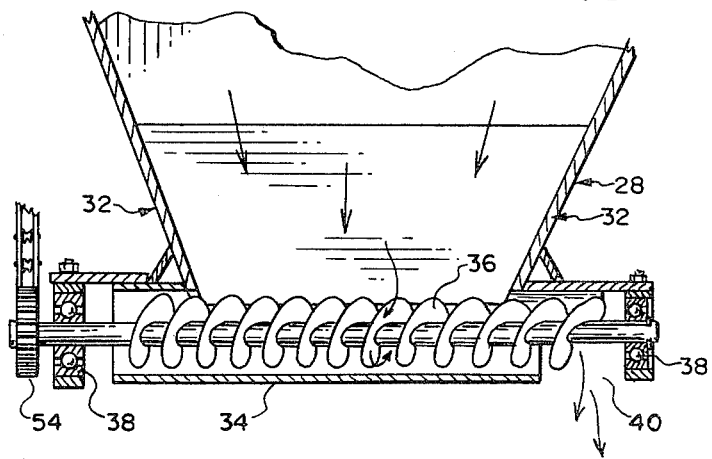
FIG. 7 is a detailed sectional view taken on line 7—7 of FIG. 5 showing a mini-hopper and mini-auger and the associated discharge opening.

As shown in FIG. 3, a hydraulic drive system 44 is provided to drive the mini-augers 36. The drive system 44 includes a hydraulic motor 46 having a drive sprocket 48 connected thereto. An endless drive chain 50 is mounted on the drive sprocket 48, and extends around a plurality of idler sprockets 52 and mini-auger drive sprockets 54 to drive all the mini-augers 36 at a uniform rate.

Hydraulic pressure is supplied to the hydraulic motor 46 through suitable hydraulic conduits 56 which are connected to the towing vehicle's hydraulic drive system (not shown).

Various modifications of the drive system are contemplated, and it is also contemplated that additional spreaders 10 may be pivotally connected at either side of the unit shown in FIG. 1 if a wider swath through the field is desired. It will be understood that the side (or wing) units will be folded back for roadway travel.

Figure 8:
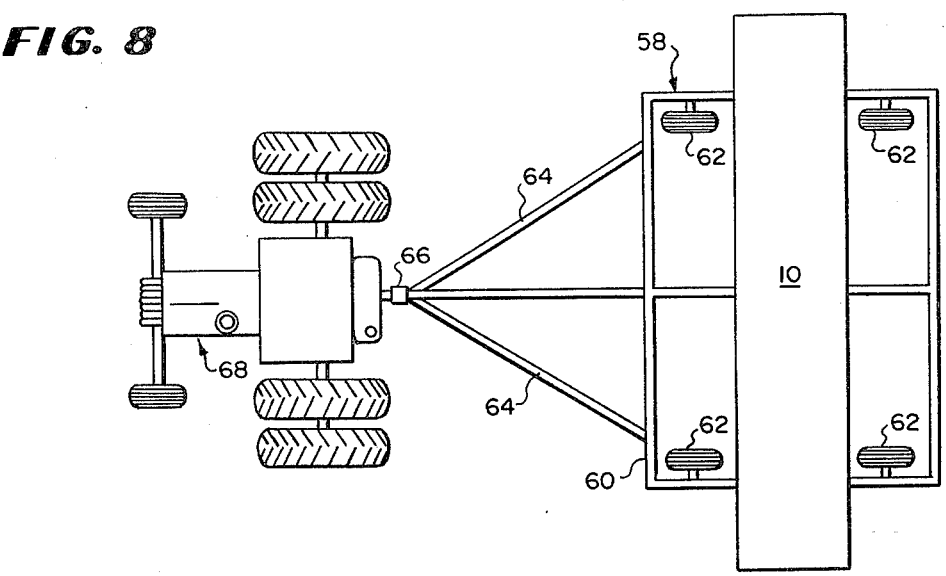
FIG. 8 is a diagrammatic top plan view of an alternate mounting system for the spreading apparatus shown in FIGS. 1–7 shown in the spreading position.
Figure 9:
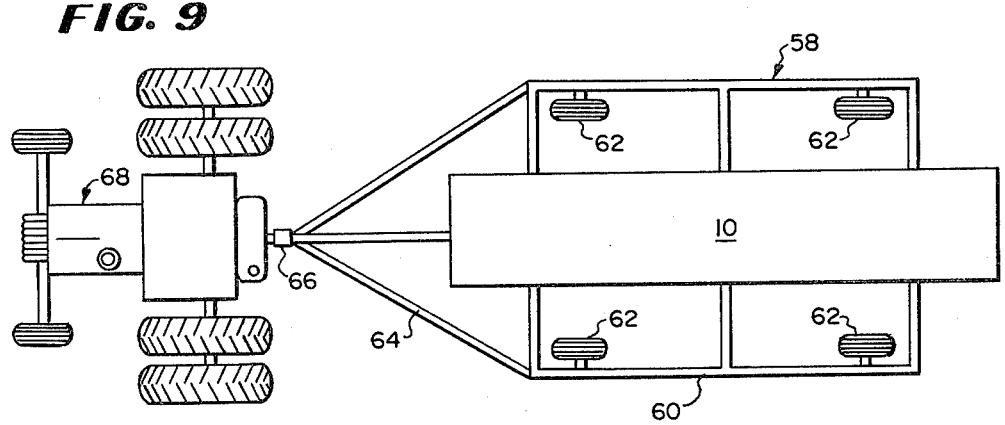
FIG. 9 is a top plan view of the alternate mounting system shown in FIG. 8 showing the spreading apparatus rotated 90° to the transport position for roadway travel.

FIGS. 8 and 9 illustrate an alternate mounting assembly 58 for a somewhat wider spreader 10. As shown in FIG. 8, the spreader 10 is pivotally mounted on a somewhat narrower horizontal frame 60 which includes wheel assemblies 62 and converging towing struts 64 which are connected to a towing hitch 66 at the forward end thereof. A tractor 68 is shown connected to tow the spreader 10 across the field to be fertilized.

Any suitable pivotal bearing means (not shown) can be used to pivotally support the spreader 10 on the horizontal frame 60. FIG. 9 shows the spreader 10 pivoted 90° from the spreading position shown in FIG. 8. In this position as shown in FIG. 9, the spreader 10 does not extend beyond the sides of the frame 60, so the apparatus may be transported along roadways between locations where it is used.

The spreader apparatus described herein is uniquely suited to uniformly spread blended fertilizer products containing ingredients having diverse specific gravities at speeds up to about 25 miles per hour, or speeds as high as the towing vehicle can travel, and at discharge rates up to about 1500 pounds per acre. The rate of spreading is really only limited by the towing vehicle's hydraulic drive system, which determines the rate of discharge of the individual augers. The rate of discharge of the augers is coordinated with the speed of forward travel to determine the pounds per acre of fertilizer which is deposited by the spreading apparatus. Although spreading speeds up to about 25 miles per hour are possible, in the more typical fertilizer application, spreading speeds between 10–20 miles per hour are more practical, to spread about 400–500 pounds per acre of a blended granular fertilizer product having an average weight of about 60–80 pounds per cubic foot.

A typical formulation for a blended granular fertilizer comprises: ammonium nitrate-containing materials weighing about 55–65 pounds per cubic foot; materials containing phosphate and sulfate salts of magnesium and calcium weighing about 90–100 pounds per cubic foot; potash-containing materials weighing about 55–65 pounds per cubic foot; and diammonium phosphate containing materials weighing about 55–65 pounds per cubic foot. The granular materials containing phosphate and sulfate salts of magnesium and calcium in the above differ considerably in specific gravity from the specific gravities of the other materials in the blended product. Such products are considerably less expensive than products which are subjected to additional processing steps to make all the ingredients uniform. However, as pointed out above, the typical spinner-plate spreader does not distribute these non-uniform blends uniformly.

A substantial saving in fertilizer cost can be realized by using the positive discharge, gravity flow spreader of the subject invention. Uniform fast spreading of the blended granular product described above is possible because of the novel spreading apparatus design which is well-adapted to provide uniform, all-speed spreading of blended granular products of all grades.

Various embodiments of the invention are considered to be included within the scope of the following claims.

I claim:

1. A spreading apparatus for uniformly spreading a blended granular product containing ingredients of different specific gravities, said apparatus comprising:
    (a) a large hopper for receiving a blended granular product, said hopper having an open top, side walls, end walls and a bottom portion;
    (b) a plurality of smaller hoppers disposed at uniform intervals across the bottom portion of said large hopper, each of said smaller hoppers having a bottom portion with a discharge opening therein, said smaller hoppers each being adapted to receive equal portions of the granular product loaded in said large hopper by gravity flow;

(c) a plurality of auger-type conveyors, one of said auger-type conveyors being horizontally disposed in the bottom portion of each of said smaller hoppers on an axis parallel to the direction of travel of the apparatus during spreading, each of said auger-type conveyors being adapted to receive granular product by gravity flow and to discharge metered amounts of said granular product through the associated discharge opening at the same rate in cooperation with all the other discharge means of said spreading apparatus to thereby obtain uniform spreading of said granular product.

2. The apparatus of claim 1, including transport means for said spreading apparatus to move said apparatus across an area to be treated with granular product.

3. The apparatus of claim 1, including hydraulic drive means for driving all the discharge means at the same uniform rate.

4. The apparatus of claim 1, including means to pivot only the side portions of the apparatus to a position about 90° from its spreading position to thereby decrease its overall width to facilitate transport over narrow roadways.

5. The apparatus of claim 1, in which the spreading apparatus comprises at least one fixed central section and two similar side sections which are pivotable to a wider spreading position and a narrower transport position.

6. The apparatus of claim 1, comprising a relatively wide main hopper pivotally supported on a transport means, said main hopper being pivotable to a wide spreading position and to a transport position about 90° from the spreading position for transport on roadways.

7. The method of uniformly spreading blended granular products containing ingredients of different specific gravities employing the gravity flow, positive discharge spreading apparatus of any of claims 1, 2, 3, 4 and 5.

8. The method of claim 7, in which the blended granular product is a fertilizer comprising: ammonium nitrate-containing materials weighing about 55–65 pounds per cubic foot; materials containing phosphate and sulfate salt of magnesium and calcium weighing about 90–100 pounds per cubic foot; potash-containing materials weighing about 55–65 pounds per cubic foot; and diammonium phosphate-containing materials weighing about 55–65 pounds per cubic foot.

9. The method of claim 7, in which the spreading apparatus is moved over the area on which the blended granular product is spread at forward speeds up to 25 miles per hour while uniformly discharging said blended granular product at rates up to 1500 pounds per acre.

10. The method of claim 9, in which the rate of forward travel of said spreading apparatus is about 10–20 miles per hour and the rate of discharge of said blended granular product is about 400–500 pounds per acre for a fertilizer blended granular product having an average weight of about 60–80 pounds per cubic foot.

* * * * *